US012588667B2

(12) United States Patent
Park et al.

(10) Patent No.: US 12,588,667 B2
(45) Date of Patent: Mar. 31, 2026

(54) FISHING SINKER DEVICE BASED ON MAGNET

(71) Applicants: Mi Jung Park, Gyeonggi-do (KR); Hee Jung Jung, Incheon (KR)

(72) Inventors: Mi Jung Park, Gyeonggi-do (KR); Sang Hyun Park, Gyeonggi-do (KR); Hee Jung Jung, Incheon (KR)

(73) Assignees: Mi Jung Park, Gyeonggi-do (KR); Hee Jung Jung, Incheon (KR)

( * ) Notice: Subject to any disclaimer, the term of this patent is extended or adjusted under 35 U.S.C. 154(b) by 0 days.

(21) Appl. No.: 18/828,141

(22) Filed: Sep. 9, 2024

(65) Prior Publication Data

US 2025/0081954 A1      Mar. 13, 2025

(30) Foreign Application Priority Data

Sep. 8, 2023      (KR) ........................ 10-2023-0119562

(51) Int. Cl.
A01K 95/00            (2006.01)

(52) U.S. Cl.
CPC .................................. A01K 95/005 (2013.01)

(58) Field of Classification Search
CPC ....... A01K 95/00; A01K 95/02; A01K 95/005
See application file for complete search history.

(56) References Cited

U.S. PATENT DOCUMENTS

| | | | | | |
|---|---|---|---|---|---|
| 77,774 | A | * | 5/1868 | Smith | A01K 93/00 43/43.14 |
| 402,231 | A | * | 4/1889 | Coles et al. | A01K 93/00 24/114.5 |
| 549,332 | A | * | 11/1895 | Sewell | A01K 93/00 43/43.14 |
| 2,177,007 | A | * | 10/1939 | Smith | A01K 95/00 43/43.15 |
| 2,863,253 | A | * | 12/1958 | Hettinger | A01K 95/00 D22/145 |
| 3,180,052 | A | * | 4/1965 | Malesko | A01K 95/00 43/43.12 |

(Continued)

FOREIGN PATENT DOCUMENTS

| | | |
|---|---|---|
| KR | 20-0361634 Y1 | 9/2004 |
| KR | 10-2008-0067725 A | 7/2008 |

(Continued)

*Primary Examiner* — Richard G Davis
(74) *Attorney, Agent, or Firm* — PLEECHAE IP, LLC

(57)          ABSTRACT

A fishing sinker device is configured to extend based on a coupling force of magnets. The fishing sinker device includes a main member formed at least partially of a magnetic material and including a lower coupling part, a sub member formed to be engaged with the main member with the same diameter, and configured to maintain a coupling force therebetween by a permanent magnet accommodated in an upper coupling part thereof, and an adjustment member added to at least one of the main member and the sub member to adjust a function thereof. Accordingly, the sinker which allows the bait to reach the desired depth during fishing have effects of increasing the usability since the shape and function of the sinker can be easily expanded matching with the type of fishing while maintaining the desired length and weight of the sinker by a magnetic force.

7 Claims, 5 Drawing Sheets

(56)                    References Cited

U.S. PATENT DOCUMENTS

|              |      |        |            |            |
|--------------|------|--------|------------|------------|
| 3,800,459 A * | 4/1974 | Fleischaker | ............ | A01K 95/00 |
|              |      |        |            | 43/44.9    |
| 9,867,365 B1 * | 1/2018 | Rosenbloom | .......... | A01K 95/02 |
| 2017/0071179 A1 * | 3/2017 | Jamil | ..................... | A01K 95/02 |
| 2021/0267183 A1 * | 9/2021 | Pramann | ................ | A01K 85/01 |

FOREIGN PATENT DOCUMENTS

| KR | 20-2010-0002531 U |   | 3/2010  |            |            |
|----|-------------------|---|---------|------------|------------|
| KR | 10-2015-0069860 A |   | 6/2015  |            |            |
| KR | 102244763 B1 | * | 4/2021  | ............ | A01K 95/00 |
| KR | 20210001102 U | * | 5/2021  | ............ | A01K 95/02 |
| KR | 10-2021-0130987 A |   | 11/2021 |            |            |
| KR | 10-2022-0033393 A |   | 3/2022  |            |            |
| KR | 10-2454076 B1 |   | 10/2022 |            |            |
| KR | 10-2493523 B1 |   | 1/2023  |            |            |

* cited by examiner

FISHING SINKER DEVICE BASED ON MAGNET

CROSS-REFERENCE TO RELATED APPLICATION AND CLAIM OF PRIORITY

This application claims the benefit under 35 USC § 119 of Korean Patent Application No. 10-2023-0119562, filed on Sep. 8, 2023, in the Korean Intellectual Property Office, the entire disclosure of which is incorporated herein by reference for all purposes.

BACKGROUND

1. Field of the Invention

The present invention relates to a fishing sinker device, and more specifically, to a fishing sinker device which extends based on a coupling force of a magnet to stably maintain a bait at the desired depth during fishing in freshwater or saltwater.

2. Description of the Related Art

Usually, in freshwater fishing and sea fishing, sinkers (weights) having various shapes and sizes are used to quickly sink a tackle to the desired depth while preventing it from floating. In the case of sea fishing, it is important to adjust a weight of the sinker due to relatively deep water and currents. Although the weights of various sinkers are determined by the size thereof, for finely adjusting the weight, smaller weight pieces are sometimes added to the sinker. A method of connecting the sinkers with magnets having a split structure makes it easy to adjust the weight of the entire sinker and eliminates use of lead, which has a high risk of contaminating the environment.

As prior art documents related to the sinker using magnets, it may refer to Korean Patent Laid-Open Publication No. 2015-0069860 (Patent Document 1) and Korean Patent Registration Publication No. 2493523 (Patent Document 2), etc.

Patent Document 1 discloses sinkers inserted into a pair of connection parts through which a fishing line passes, wherein a plurality of sinkers made of magnets are attached to each other between first sinkers inserted into holes of the connection parts to form a sinker assembly, which is configured so that the weight of the entire sinker can be adjusted as necessary. Accordingly, it is expected that the sinking speed as well as the weight of the sinker can be quickly and easily adjusted matching with the flow of the current without a separate tool.

Patent Document 2 discloses an expandable sinker suspended from a fishing line, which includes: a main weight member of a magnetic body; a connection ring for connecting the fishing line to a tip portion of the main weight member; a first weight expansion member of a magnetic body; and a first connection magnet disposed in the first weight expansion member for connecting with the main weight member by a magnetic force. Accordingly, it is expected that the weight of the sinker can be adjusted while maintaining as it is without separating from the fishing line.

However, the above-described prior art documents have limitations in that an outer surface of the sinker is not smooth due to the structure in which the plurality of magnets are coupled with each other, and it is not easy to expand the shape and function matching with the type of fishing.

SUMMARY

In consideration of the above-mentioned circumstances, it is an object of the present invention to provide a magnet-based fishing sinker device capable of easily expanding the shape and function thereof matching with the type of fishing while maintaining the desired length and weight by a magnetic force so that a bait reaches the desired depth during fishing in freshwater or saltwater.

To achieve the above object, according to an aspect of the present invention, there is provided a fishing sinker device configured to extend based on a coupling force of a magnet, the device including: a main member formed at least partially of a magnetic material and including a lower coupling part; a sub member formed to be engaged with the main member with the same diameter, and configured to maintain a coupling force therebetween by a permanent magnet accommodated in an upper coupling part thereof; and an adjustment member added to at least one of the main member and the sub member to adjust a function thereof.

As a detailed configuration of the present invention, the main member and the sub member are characterized by further including through holes which are communicated with each other at centers thereof.

As a detailed configuration of the present invention, at least one of the main member and the sub member is characterized by further including an auxiliary member configured to surround an outer surface thereof in a conical shape.

As a detailed configuration of the present invention, the auxiliary member is characterized by including a mounting groove formed in a cylindrical shape at a center thereof, a disk attached to a bottom thereof, and a permanent magnet coupled to a center of the disk.

As a detailed configuration of the present invention, the auxiliary member is characterized by further including a luminous body detachably attached to an outer surface thereof.

As a detailed configuration of the present invention, the adjustment member is characterized by including a weight tube accommodated in a sealed space defined by an accommodation groove and a stopper block.

As a detailed configuration of the present invention, the adjustment member is characterized by further including a fitting concave-convex structure on an outer surface thereof.

As a detailed configuration of the present invention, the lower coupling part is characterized by being any one of a lower socket or a lower plug, wherein, when the lower coupling part is formed as the lower socket, the upper coupling part is formed as an upper plug, so that the upper plug is inserted into the lower socket, and when the lower coupling part is formed as the lower plug, the upper coupling part is formed as an upper socket, so that the lower plug is inserted into the upper socket.

As described above, according to the present invention, the sinker which allows a bait to reach the desired depth during fishing have effects of increasing the usability since the shape and function of the sinker can be easily expanded matching with the type of fishing while maintaining the desired length and weight of the sinker by a magnetic force.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, embodiments of the present invention will be described in detail with reference to the accompanying drawings.

The present invention proposes a fishing sinker device configured to extend based on the coupling force of magnets. It is targeting a sinker configured to maintain a bait at the desired depth during fishing in freshwater or saltwater, but it is not limited thereto. According to the structure which extends by the magnetic force, it is possible to eliminate the use of a separate tool.

Figure 1:
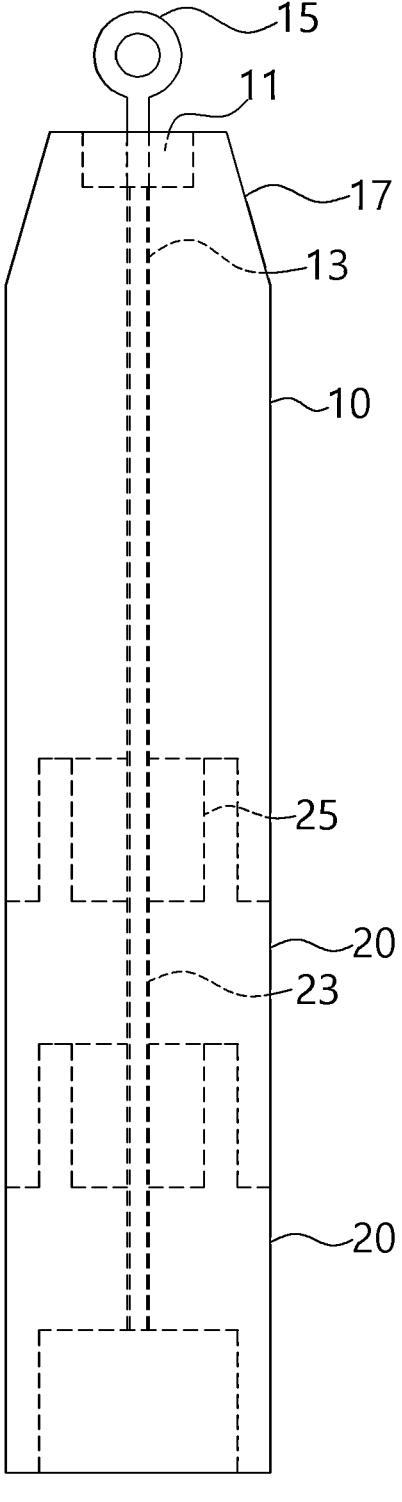
FIG. 1 is an outline view illustrating the basic structure of a sinker according to an embodiment of the present invention.
Figure 2A:
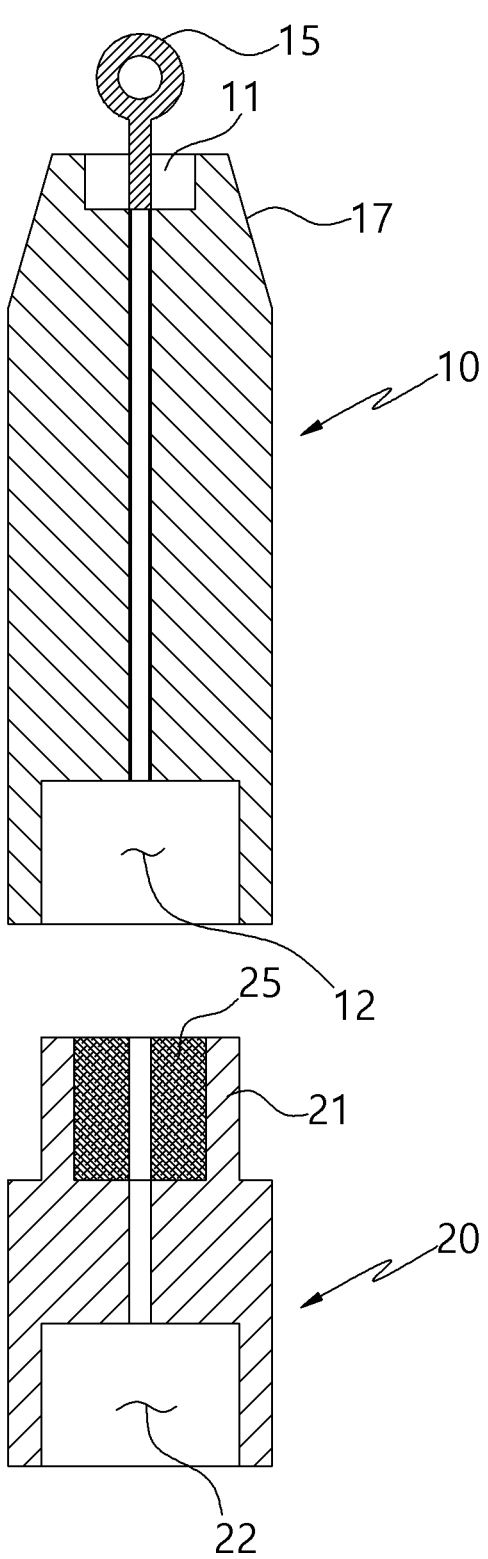
FIG. 2A is a schematic exploded view illustrating major parts of the sinker according to an embodiment of the present invention.
Figure 2B:
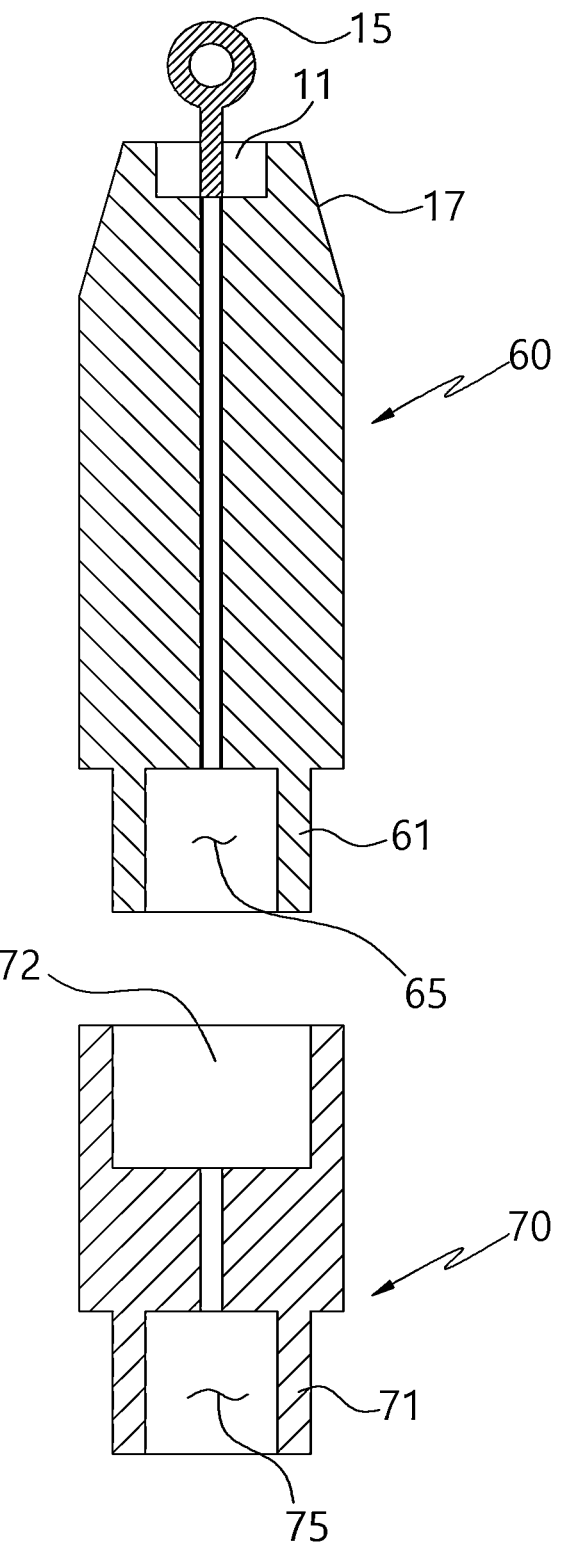
FIG. 2B is a schematic exploded view illustrating major parts of a sinker according to another embodiment of the present invention.

FIG. 1 is an outline view illustrating the basic structure of a sinker according to an embodiment of the present invention, FIG. 2A is a schematic exploded view illustrating major parts of the sinker according to an embodiment of the present invention, and FIG. 2B is a schematic exploded view illustrating major parts of a sinker according to another embodiment of the present invention.

Referring to FIGS. 1, 2A and 2B, the sinker of the present invention has a structure in which main members 10 and 60 formed at least partially of a magnetic material include lower coupling parts 12 and 61. In addition, sub members 20 and 70 are formed with the same diameter as the main members 10 and 60 so that they can be engaged with each other, and the coupling force with the main members 10 and 60 can be maintained by permanent magnets accommodated in upper coupling parts 21 and 72 of the sub members 20 and 70.

Specifically, when the lower coupling part of the main member 10 is formed as a lower socket 12, the upper coupling part of the sub member 20 is formed as an upper plug (here, the upper plug is formed as an upper plug body 21 and a permanent magnet 25). Coupling between the upper and lower coupling parts is made in a way that the upper plug is inserted into the lower socket 12.

Meanwhile, when the lower coupling part of the main member 60 is formed as a lower plug (here, the lower plug is formed as a lower plug body 61 and a permanent magnet 65), the upper coupling part of the sub member 70 is formed as an upper socket 72. Coupling between the upper and lower coupling parts is made in a way that the lower plug is inserted into the upper socket 72.

In this way, the main member and the sub member may be formed in two types. The two types are different in that they are symmetrical in terms of the shape, but both of the two types have the same effect of increasing the convenience by coupling or separating the main member and the sub member, and thereby increasing or decreasing the sinker to the desired length and weight by the magnetic force.

Therefore, hereinafter, among the two types, only the case where the lower coupling part of the main member 10 is formed as the lower socket 12 and the upper coupling part of the sub member 20 is formed as the upper plug will be representatively described. However, it is not limited thereto, and it should be interpreted that the present invention is also applied to the case where the lower coupling part of the main member 60 is formed as the lower plug and the upper coupling part of the sub member 70 is formed as the upper socket 72.

Referring again to FIG. 1, an upper groove 11, the lower socket 12, a tie ring 15, and the like, which form the main member 10 are illustrated. In the description of the present invention, the terms indicating directions such as an upper, lower, and the like are based on the orientation shown in FIG. 1. The upper groove 11 may be formed separately and may be integrated with other components described below. The lower socket 12 is formed in a cylindrical shape and may be coupled with the sub member 20 described below. The tie ring 15 may be coupled to the upper groove 11. The main member 10 may be formed entirely of a magnetic material, or only a region adjacent to the lower socket 12 may be formed of the magnetic material.

In addition, according to the present invention, the sinker has a structure in which the coupling force with the main member 10 is maintained by the sub member 20 formed to be engaged therewith with the same diameter using a magnetic force of the permanent magnet 25 accommodated in the upper plug body 21.

Referring to FIGS. 1 and 2A and 2B, a state where the sub member 20 is concentrically connected to or separated from the lower side of the main member 10 is illustrated. The sub member 20 may be easily extended to the desired length and weight at a fishing spot with respect to the main member 10. The sub member 20 includes the upper plug body 21, a lower socket 22, and the permanent magnet 25, etc. The upper end of the sub member 20 has the upper plug body 21 formed in a cylindrical shape and inserted into the lower socket 12 of the main member 10. The main member 10 and the sub member 20 are formed with the same diameter (outer diameter) so that their outer surfaces extend smoothly without any protruding portion. The lower socket 22 of the sub member 20 is formed with the same specification and geometry as the lower socket 12 of the main member 10. The permanent magnet 25 is closely accommodated in the upper plug body 21 so as to maintain sufficient coupling force between the members.

As a detailed configuration of the present invention, the main member 10 and the sub member 20 are characterized by further including through holes 13 and 23 which are communicated with each other at centers thereof.

FIG. 1 illustrates a state where the through holes 13 and 23 are communicated with each other at the centers of the main member 10 and the sub member 20. When the through hole 13 of the main member 10 and the through hole 23 of the sub member 20 are communicated with each other, they may be converted into a 'ring sinker' or a 'hole sinker' and utilized as necessary. Of course, the through holes 13 and 23 are formed in a size that allows a fishing line to easily pass, and the upper tie ring 15 is coupled in a detachable structure.

As a detailed configuration of the present invention, at least one of the main member 10 and the sub member 20 is characterized by further including an auxiliary member 30 configured to surround an outer surface thereof in a conical shape.

Figure 3:
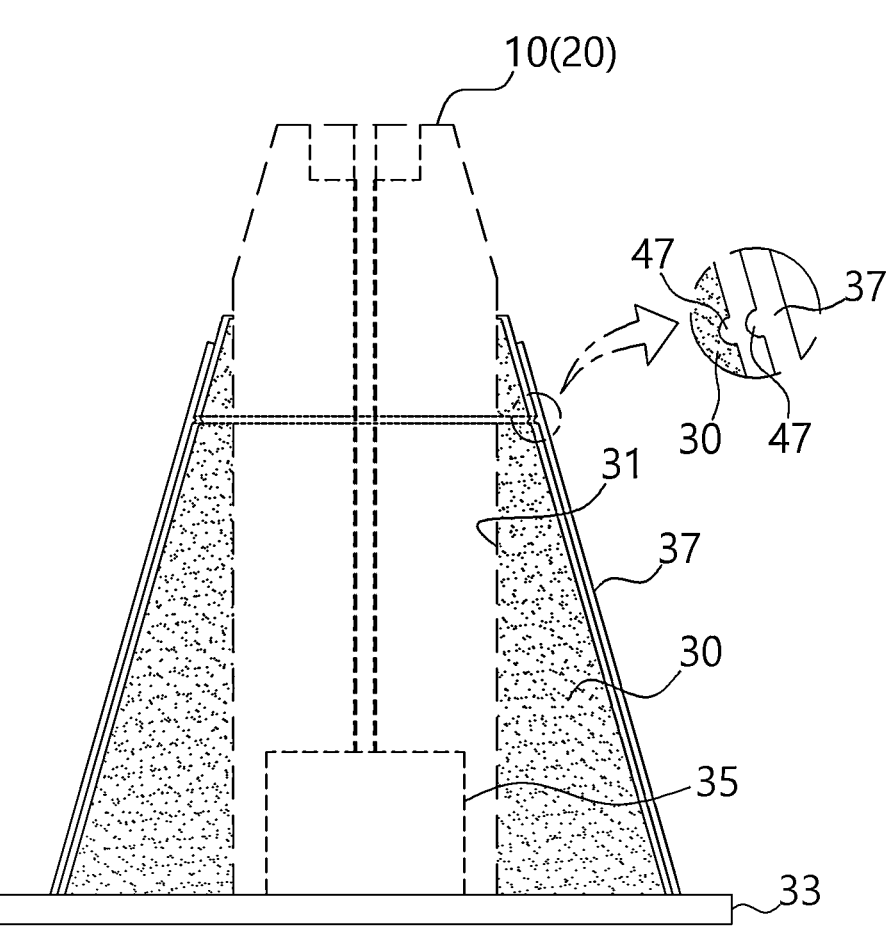
FIG. 3 is a schematic view illustrating an auxiliary member of the sinker according to an embodiment of the present invention.

Referring to FIG. 3, a state where the conical auxiliary member 30 surrounds the main member 10 is illustrated. The auxiliary member 30 may also be coupled to the sub member 20 in the same manner in addition to the main member 10. It is preferable that the material of the auxiliary member 30 is the same as that of the main member 10 or the sub member 20, but it is not limited thereto. In any case, the sinker having the auxiliary member 30 coupled thereto may be less affected by the current while being stably placed on the bottom of the ocean. The height of the auxiliary member 30 is set so as not to exceed a slope surface 17 of the main member 10.

As a detailed configuration of the present invention, the auxiliary member 30 is characterized by including a mounting groove 31 formed in a cylindrical shape at the center thereof, a disk 33 attached to the bottom thereof, and a permanent magnet 35 connected to the center of the disk 33.

FIG. 3 illustrates the mounting groove 31, the disk 33, and the permanent magnet 35 forming the auxiliary member 30 in an assembled state. The mounting groove 31 is formed in the cylindrical shape to closely accommodate the main member 10. The disk 33 is formed as a disc having the same diameter as a bottom surface of the auxiliary member 30 to be attached thereto. The permanent magnet 35 is attached to the center of an upper surface of the disk 33 so as to be concentric with the mounting groove 31. As soon as the auxiliary member 30 is fitted to the main member 10 or the sub member 20 through the lower socket 12 or 22 thereof, the coupling force therebetween is maintained by the permanent magnet 35.

As a detailed configuration of the present invention, the auxiliary member 30 is characterized by further including a luminous body 37 detachably coupled to the outer surface thereof.

FIG. 3 illustrates a state where the conical luminous body 37 is mounted on the outer surface of the auxiliary member 30. The luminous body 37 may be easily replaced with the desired color as necessary at the fishing site. To this end, it is preferable that one or more fitting concave-convex structures 47 is applied to the auxiliary member 30 and the luminous body 37. The fitting concave-convex structure 47 is formed as a groove with a semicircular cross-section on one side (e.g., the auxiliary member 30) and a protrusion with a semicircular cross-section corresponding to the groove on the other side (e.g., the luminous body 37), which are fitted with each other.

In addition, according to the present invention, the sinker has a structure in which an adjustment member 40 is added to at least one of the main member 10 and the sub member 20 to adjust a function thereof.

Figure 4:
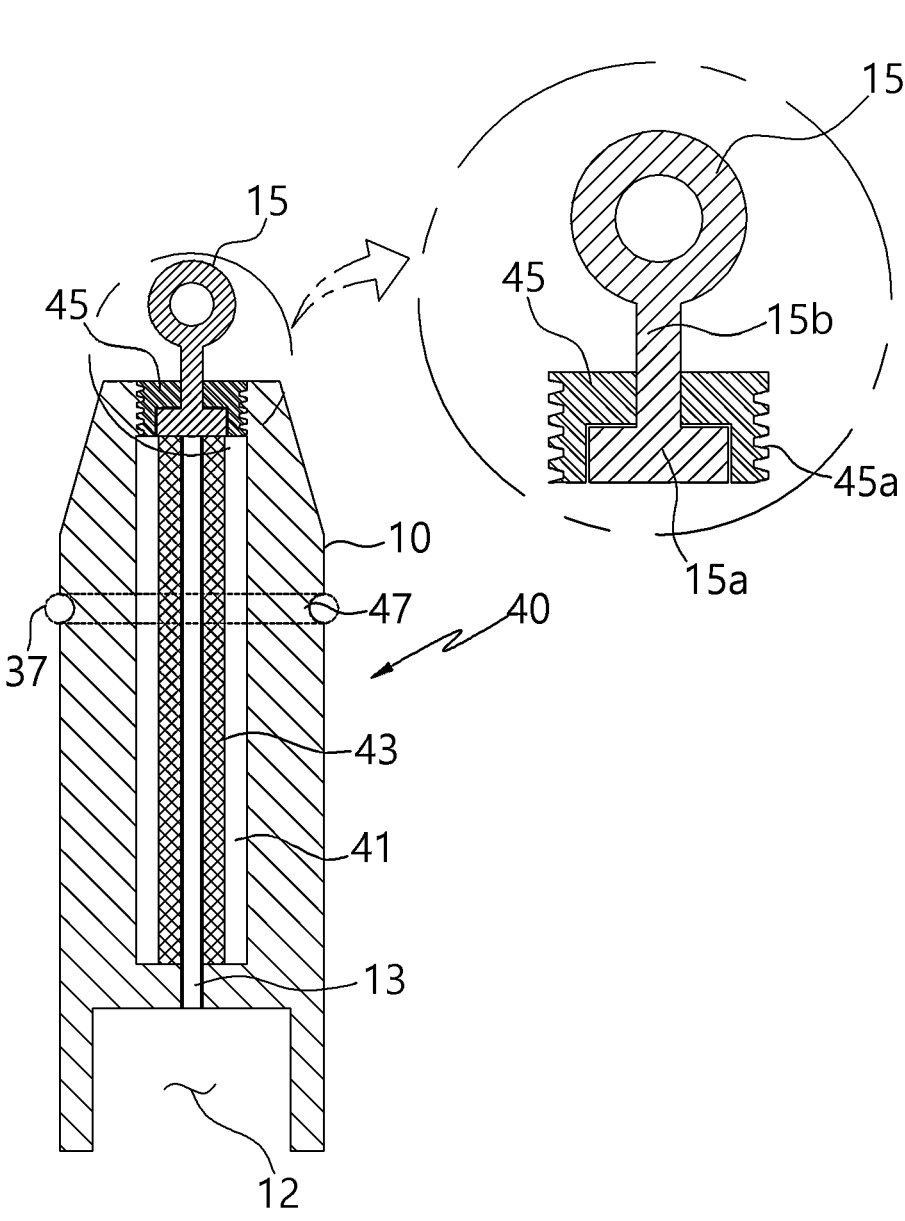
FIG. 4 is a schematic view illustrating an adjustment member of a sinker according to another embodiment of the present invention.

Referring to FIG. 4, it illustrates a state where the adjustment member 40 is added to the main member 10, but may also be added to the sub member 20 in the same manner. The target for adjusting the function of the adjustment member 40 is presented by weight and luminescence, but it is not limited thereto.

As a detailed configuration of the present invention, the adjustment member 40 is characterized by including a weight tube 43 accommodated in a sealed space defined by an accommodation groove 41 and a stopper block 45.

FIG. 4 illustrates the accommodation groove 41, the weight tube 43, and the stopper block 45 forming the adjustment member 40. The accommodation groove 41 is formed concentrically with the through hole 13, but it is not communicated with the lower socket 12. If the accommodation groove 41 and the lower socket 12 are communicated with each other, the magnetic force of the permanent magnets 25 and 35 may be reduced. It is preferable that the weight tube 43 is formed of various materials with different lengths and outer diameters so as to provide a finely adjustable weight that cannot be implemented only by the main member 10 and the sub member 20. The stopper block 45 may be coupled to an upper end of the accommodation groove 41 in various known ways. FIG. 4 exemplifies a screw coupling method by a thread 45a, but it is not limited thereto. The stopper block 45 is detachably coupled to the tie ring 15. The tie ring 15 may have a small block 15a formed at a lower end thereof.

Meanwhile, a portion (upper) region of a load 15b connecting the tie ring 15 and the small block 15a may include a square cross-section. In this case, when the tie ring 15 is pushed in and is engaged with the stopper block 45 through the square cross-section, the stopper block 45 may be attached and detached through the tie ring 15 without a separate tool.

As a detailed configuration of the present invention, the adjustment member 40 is characterized by further including the fitting concave-convex structure 47 on its outer surface.

FIG. 4 illustrates one fitting concave-convex structure 47 formed on the outer surface of the main member 10, but a plurality of fitting concave-convex structures may be formed, and the same method may be applied to the sub member 20. The fitting concave-convex structure 47 is suitably formed as a groove structure, but may also be formed as a protrusion structure. In either case, it allows the ring-shaped luminous body 37 to be easily attached to or detached form the fitting concave-convex structure 47. Of course, it is preferable that the luminous body is formed of an elastic material to increase the coupling force.

The present invention is not limited to the above-described embodiments, and it is apparent to those skilled in the art that various modifications and variations can be made without departing from the spirit and scope of the present invention. Therefore, these modifications and variations should be falling within the scope of the present invention.

What is claimed is:

1. A fishing sinker device, the device comprising:
   a cylindrical main member formed at least partially of a magnetic material and including a lower coupling part;
   a cylindrical sub member having a diameter which is the same as a diameter of the cylindrical main member, the cylindrical sub matter formed to be engaged with the cylindrical main member and configured to maintain a coupling force therebetween by a permanent magnet accommodated in an upper coupling part thereof; and
   an adjustment member including an accommodation groove formed within at least one of the main member and the sub member, a stopper block coupled to an upper end of the accommodation groove, and a weight tube accommodated in a sealed space defined by the accommodation groove and the stopper block.

2. The device according to claim 1, wherein the main member and the sub member further include through holes which are communicated with each other at centers thereof, and the accommodation groove is formed concentrically with the through hole.

3. The device according to claim 1, wherein at least one of the main member and the sub member further includes an auxiliary member configured to surround an outer surface thereof in a conical shape.

4. The device according to claim 3, wherein the auxiliary member includes a mounting groove formed in a cylindrical shape at a center thereof, a disk attached to a bottom thereof, and a permanent magnet coupled to a center of the disk.

5. The device according to claim 3, wherein the auxiliary member further includes a luminous body detachably attached to an outer surface thereof.

6. The device according to claim 1, wherein the adjustment member further includes a fitting concave-convex structure on an outer surface thereof.

7. The device according to claim 1, wherein the lower coupling part is any one of a lower socket or a lower plug, wherein, when the lower coupling part is formed as the lower socket, the upper coupling part is formed as an upper plug, so that the upper plug is inserted into the lower socket, and when the lower coupling part is formed as the lower plug, the upper coupling part is formed as an upper socket, so that the lower plug is inserted into the upper socket.

\* \* \* \* \*